(12) United States Patent
Oh (10) Patent No.: US 10,184,526 B2
(45) Date of Patent: Jan. 22, 2019

(54) CONSTANT VELOCITY JOINT BOOT ASSEMBLY

(71) Applicant: Dana Automotive Systems Group, LLC, Maumee, OH (US)

(72) Inventor: Seung Tark Oh, Ann Arbor, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 15/404,919

(22) Filed: Jan. 12, 2017

(65) Prior Publication Data

US 2017/0122379 A1    May 4, 2017

Related U.S. Application Data

(63) Continuation of application No. 14/703,187, filed on May 4, 2015, now Pat. No. 9,574,617.

(60) Provisional application No. 62/028,847, filed on Jul. 25, 2014.

(51) Int. Cl.
*F16D 3/84* (2006.01)
*F16J 3/02* (2006.01)

(52) U.S. Cl.
CPC .............. *F16D 3/845* (2013.01); *F16J 3/02* (2013.01)

(58) Field of Classification Search
CPC .... F16D 3/845; F16D 3/848; F16D 2003/846; F16J 3/02; F16J 15/52; Y10T 403/31; Y10T 403/315
USPC ..... 464/173, 904–906; 403/50, 51; 277/634, 277/635; 74/18, 18.1, 18.2
See application file for complete search history.

(56) References Cited

U.S. PATENT DOCUMENTS

| | | | | |
|---|---|---|---|---|
| 3,869,878 A | * | 3/1975 | Davies | F16D 3/227 464/906 |
| 4,767,381 A | * | 8/1988 | Brown | F16D 3/845 464/906 |
| 5,183,351 A | * | 2/1993 | Schneider | F16D 3/845 403/50 |
| 5,230,660 A | | 7/1993 | Warnke | |

(Continued)

FOREIGN PATENT DOCUMENTS

DE   29823919 U1   1/2000
DE   19831015 C1   3/2000

(Continued)

OTHER PUBLICATIONS

European Patent Office, Communication pursuant to Article 94(3) EPC issued in Appln. No. 15178150.7-1012, dated May 11, 2018 6 pages, European Patent Office, Munich, Germany.

*Primary Examiner* — Josh Skroupa
(74) *Attorney, Agent, or Firm* — Marshall & Melhorn, LLC (57) ABSTRACT

A constant velocity joint boot assembly with a boot can having a first end portion connected to an outer race and a second end portion cantilevered from the outer race. The second end portion has a planar portion extending from the first end portion at an angle. A radially outward extending end extends from the planar portion. A boot has a first end and a second end. The first end has an inner surface that is directly connected to an inner surface of the planar portion of the boot can. A sleeve has one end portion connected to an inner surface of an inner race and a second end portion extending axially away from the inner race. The boot has a lower portion engaged with the sleeve.

15 Claims, 9 Drawing Sheets

(56) References Cited

U.S. PATENT DOCUMENTS

| | | | |
|---|---|---|---|
| 5,725,432 A * | 3/1998 | Konegen | F16D 3/223 |
| | | | 464/906 |
| 6,264,568 B1 | 7/2001 | Frazer et al. | |
| 6,293,873 B1 | 9/2001 | Iwano et al. | |
| 6,579,187 B2 | 6/2003 | Ramey | |
| 6,699,129 B2 * | 3/2004 | Wang | F16D 3/223 |
| | | | 137/512.15 |
| 6,793,581 B2 * | 9/2004 | Meyer | F16D 3/223 |
| | | | 464/906 |
| 6,793,584 B2 * | 9/2004 | Ramey | F16D 3/845 |
| | | | 464/175 |
| 6,926,612 B2 * | 8/2005 | Wang | F16D 3/845 |
| | | | 464/173 |
| 6,988,949 B2 * | 1/2006 | Wang | F16D 3/223 |
| | | | 137/512.15 |
| 7,040,992 B2 * | 5/2006 | Dine | F16D 3/2237 |
| | | | 464/145 |
| 7,094,155 B2 | 8/2006 | Hosoya et al. | |
| 7,097,563 B2 * | 8/2006 | Benson | F16D 3/845 |
| | | | 464/906 |
| 7,097,568 B2 * | 8/2006 | Kuczera | F16D 3/845 |
| | | | 464/173 |
| 7,229,356 B2 | 6/2007 | Iwano | |
| 7,282,166 B2 | 10/2007 | Wang | |
| 7,347,785 B2 | 3/2008 | Worman, Jr. et al. | |
| 7,677,981 B2 * | 3/2010 | Zierz | F16D 3/845 |
| | | | 464/173 |
| 7,997,988 B2 * | 8/2011 | Wormsbaecher | F16D 1/033 |
| | | | 464/906 |
| 8,012,030 B2 * | 9/2011 | Cermak | F16D 1/116 |
| | | | 464/906 |
| 8,070,613 B2 * | 12/2011 | Cermak | F16D 3/2237 |
| | | | 464/906 |
| 8,262,489 B2 | 9/2012 | Valovick | |
| 8,287,393 B2 * | 10/2012 | Dao | F16D 3/845 |
| | | | 464/173 |
| 8,342,973 B2 * | 1/2013 | Lutz | F16D 3/2237 |
| | | | 464/906 |
| 8,771,092 B2 | 7/2014 | Fujio | |
| 2007/0173337 A1 * | 7/2007 | Wormsbaecher | F16D 3/845 |
| | | | 464/179 |
| 2012/0004044 A1 | 1/2012 | Conger et al. | |
| 2013/0102397 A1 | 4/2013 | Ooba | |
| 2013/0252748 A1 * | 9/2013 | Sugiyama | F16C 1/04 |
| | | | 464/162 |
| 2014/0213374 A1 * | 7/2014 | Cassell | F16D 3/845 |
| | | | 464/145 |

FOREIGN PATENT DOCUMENTS

| | | |
|---|---|---|
| JP | H0367723 U | 7/1991 |
| JP | 2008275133 A | 11/2008 |
| JP | 2009115203 A | 5/2009 |
| WO | 2007086172 A1 | 8/2007 |
| WO | 2014066121 A1 | 5/2014 |

* cited by examiner

CONSTANT VELOCITY JOINT BOOT ASSEMBLY

RELATED APPLICATIONS

This continuation application claims priority to and the benefit of U.S. Provisional Application Ser. No. 62/028,847 filed on Jul. 25, 2014, and U.S. Nonprovisional Application Ser. No. 14/703,187 filed May 4, 2015, both of which are incorporated by reference in their entirety.

FIELD

The device described herein relates to a boot assembly for a constant velocity joint.

BACKGROUND

Boots are well-known devices used to enclose an end of a constant velocity joint. Boots keep out dirt, debris and moisture from the joint and keep lubricant in the joint.

Figure 1:
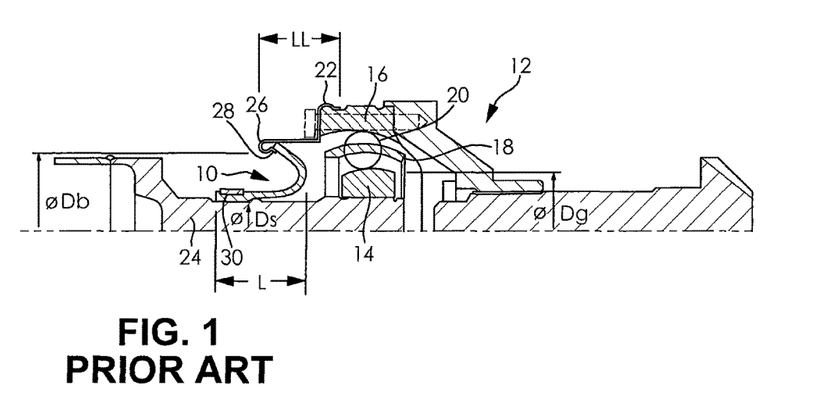
FIG. 1 is a partial side view cross section of a first prior art constant velocity joint.

One example of a prior art boot 10 for a joint 12 is depicted in FIG. 1. The joint 12 comprises an inner race 14, an outer race 16, a cage 18 and at least one ball 20 within the cage 18.

The boot 10 encloses one end of the joint 12. The boot 10 is connected at one end to the outer race 16 with a boot can 22. A boot bead 26 is formed on the boot can 22 to capture the boot 10. The boot bead 26 is generally round and formed inwardly. A boot can crimp 28 also helps hold the boot 10 in place. The boot can crimp 28 is also formed inwardly. The boot 10 is connected at the other end to a shaft 24, such as by a clamp 30.

Figure 2:
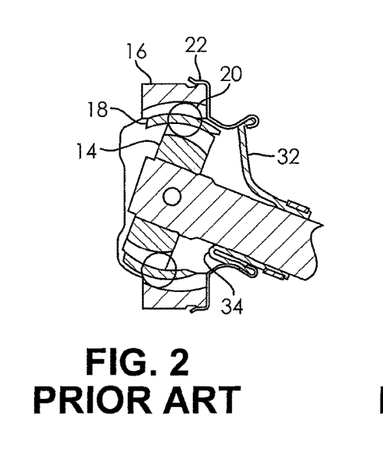
FIG. 2 is a partial side view cross section of a portion of the joint of FIG. 1 at a maximum articulation angle.

The size of the boot 10 used in FIG. 1 is characterized by boot length L, boot can length LL, boot can inner diameter Ø Db and the thickness of the boot 10. Boot length L, boot can length LL and boot can inner diameter Ø Db are determined by the required maximum static articulation angle capability, which is depicted in FIG. 2. More particularly, boot length L is determined in a way that boot length L in a joint assembly state as shown in FIG. 1 is equivalent to the boot length of an extended boot region 32 and the boot length of a contracted boot region 34 at a maximum joint angle.

Figure 3:
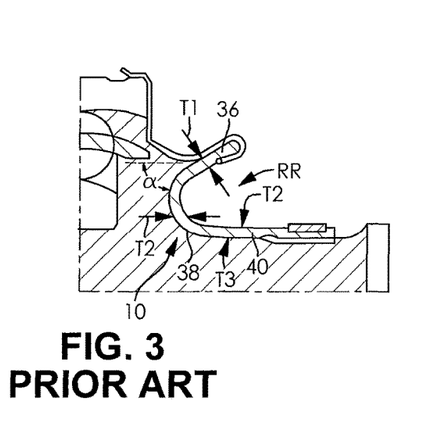
FIG. 3 is a partial side view cross section of a portion of the joint of FIG. 1.

Boot thickness for the boot 10 of FIGS. 1 and 2 is depicted in FIG. 3. The boot 10 generally has a round shape RR with an angle α from the horizontal, where the thickness T1 of an upper slope portion 36, is equal to the thickness T2 of a concave portion 38, which is equal to the thickness T3 of a lower slope portion 40. The joint boot thickness T2, T2, T3 is determined by taking into consideration boot radial and axial stiffness related to potential high risk boot failure modes, such as boot inversion and boot folding, both of which mainly occur at high joint internal pressures. Line Ø Dg represents the typical grease fill level for such a joint 12.

FIGS. 4-8 depict another prior art constant velocity joint 42 with a boot 44. The joint 42 comprises an inner race 46, an outer race 48, a cage 50 and at least one ball 52 within the cage. This joint 42 uses a sleeve 54 that couples the inner race 46 with a pinion shaft 56. A nut 58 connects the sleeve 54 to the pinion shaft 56.

The sleeve 54 in such a direct pinion mount design has a larger diameter Ds1 than a tube shaft diameter Ds in a non-direct pinion mount design, such as shown in FIGS. 1-3. Therefore, the boot can inner diameter Db1 should increase by the difference between Ds1-Ds to have the equivalent maximum static joint angle capability to that of a non-direct pinion mount design, such as in FIGS. 1-3. This results in a higher grease pressure acting on the direct pinion mount boot 44 compared with the pressure on the boot 10 depicted in FIG. 1.

Figure 4:
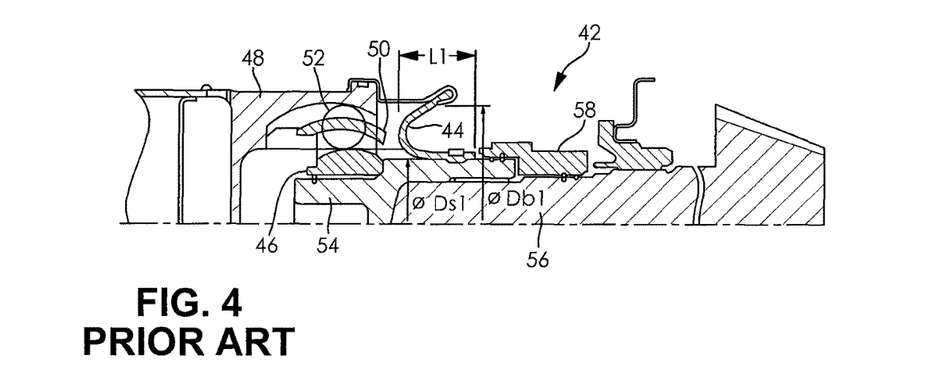
FIG. 4 is a second partial side view cross section of a prior art constant velocity joint.
Figure 5:
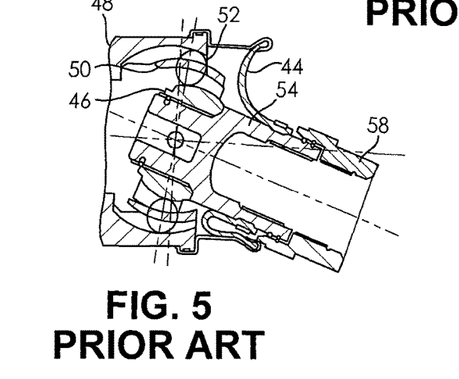
FIG. 5 is a partial side view cross section of a portion of the joint of FIG. 4 at a maximum articulation angle.

The boot length L1 is limited by the nut 58 as shown in FIG. 4, therefore, it is more difficult to make the boot length L1 equivalent to the non-direct pinion mount joint boot length L depicted in FIG. 1. This results in a boot can inner diameter Db1 being bigger to have the equivalent boot overall length required for achieving a maximum joint angle compared to the design in FIG. 1.

Figure 6:
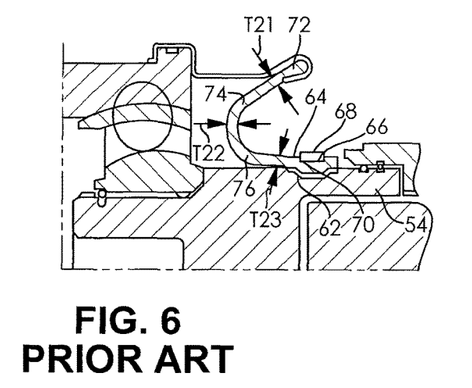
FIG. 6 is a partial side view cross section of a portion of the joint of FIG. 4.
Figures 7, 8, 9:
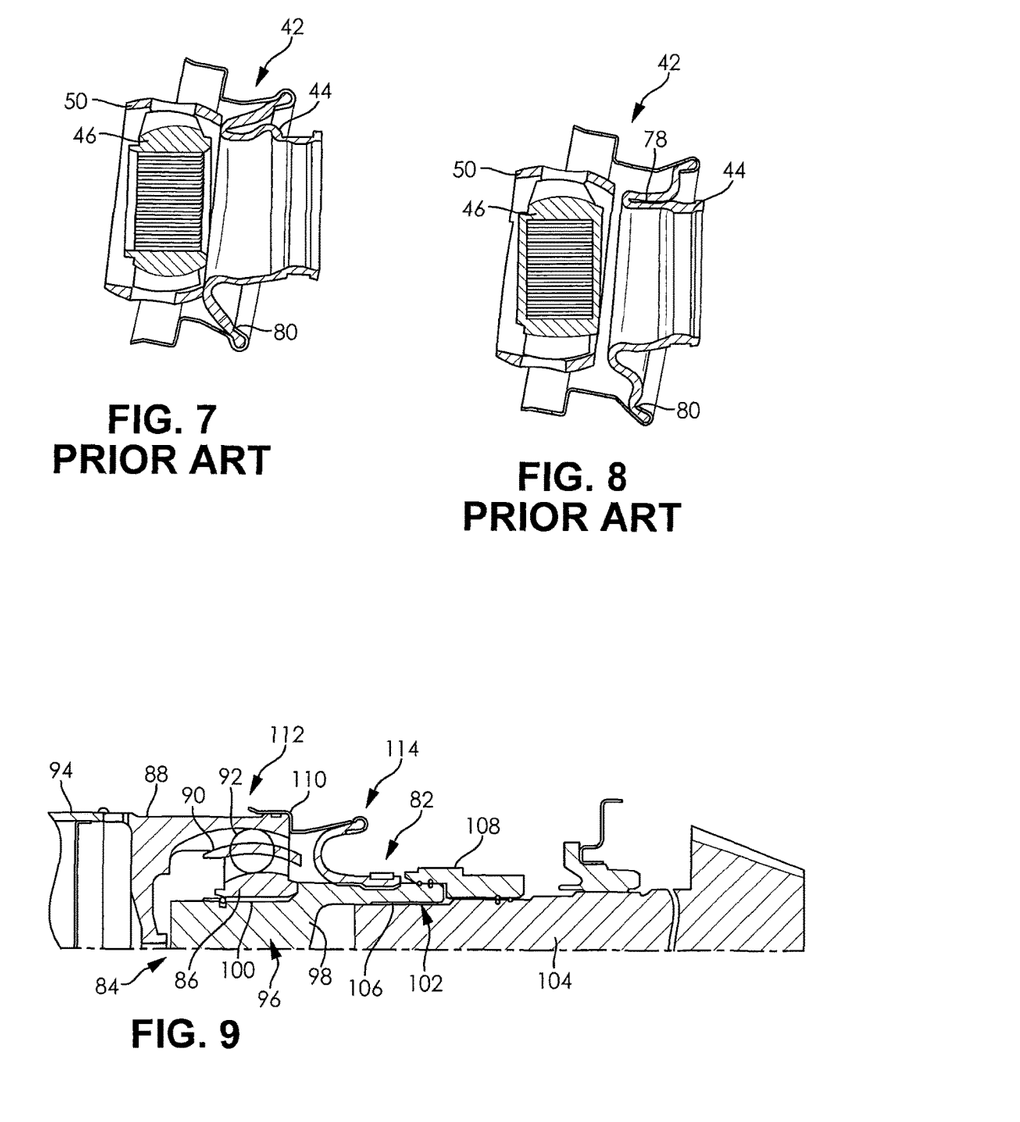
FIG. 7 is a partial side view cross section of a portion of the joint of FIG. 4.
FIG. 8 is a partial side view cross section of a portion of the joint of FIG. 4.
FIG. 9 is a partial side view cross section of a first embodiment of a constant velocity joint and boot system.

Further, the limited boot axle length L1 cannot provide a sufficient press fit contact portion 62 between the sleeve 54 and the boot 44, which causes region 64 near a boot groove seat 66 to be bumped up and tilted toward the boot groove seat 66 by a crimping force of a boot clamp 68 acting on the boot clamp seat inside corner 70, which can be appreciated from FIGS. 6 and 7.

FIG. 8 depicts a direct pinion mount joint 42 having uniform boot thickness (T21=T22=T23) that has folded/self-contacted at a boot contacted region 78 as a result of the wrong boot thickness for this design. The figure also depicts the boot 44 being severely bent at an edge of the boot can crimp 80 by high grease pressure while operating at a high temperature, a high operating speed and at a high operating angle.

In view of the disadvantages of attempting to apply a non-direct pinion mount boot system to a direct pinion mount boot system, a new design is required.

SUMMARY

A constant velocity joint boot assembly has a boot can with a first end portion connected to an outer race and a second end portion cantilevered from the outer race. The second end portion has a planar portion extending from the first end portion at an angle. A radially outward extending end extends from the planar portion. A boot has a first end and a second end. The first end has an inner surface that is directly connected to an inner surface of the planar portion of the boot can. A sleeve has one end portion connected to an inner surface of an inner race with complementary splines and a second end portion extending axially away from the inner race. The boot has a lower portion engaged with the sleeve.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting; unless the claims expressly state otherwise.

Turning to FIG. 9, one embodiment of a boot system 82 for a direct pinion mount joint 84 is depicted. The joint 84 comprises an inner race 86, an outer race 88, a cage 90 and at least one ball 92 within the cage 90. A tube 94 is connected, such as by welding, to the outer race 88. A first end 96 of a sleeve 98 is connected, such as by splines 100, to the inner diameter of the inner race 86. A second end 102 of the sleeve 98 receives a pinion shaft 104 therein, such as through a splined connection 106. A nut 108 connects the pinion shaft 104 to the sleeve 98.

Figure 10:
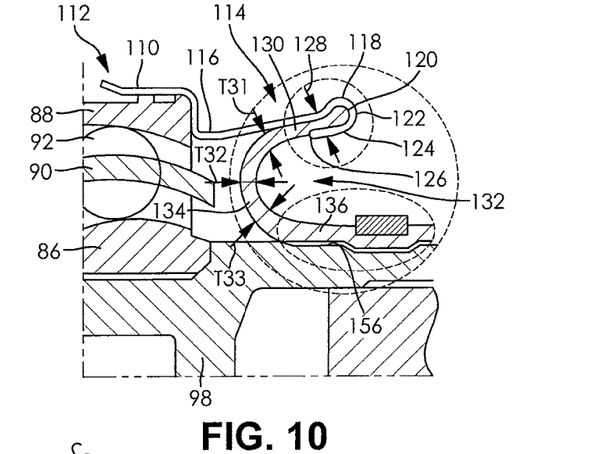
FIG. 10 is a partial side view cross section of a portion of the joint in FIG. 9.

A boot can 110 is depicted in FIGS. 9 and 10. The boot can 110 has a first end portion 112 connected to the outer race 88 and a second end portion 114 that is cantilevered over the joint 84. More particularly, the second end portion 114 is cantilevered over a portion of the sleeve 98.

Figure 10A:
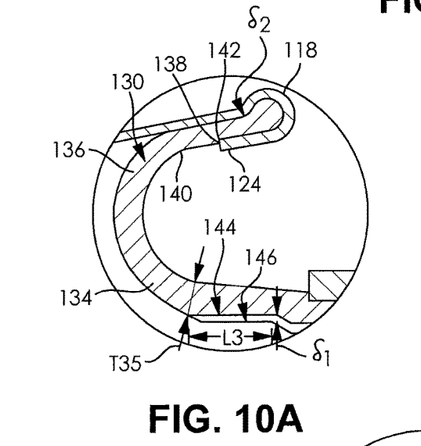
FIGS. 10A-10C are partial side view cross-sections of portions of the joint in FIG. 9.
Figure 10B:
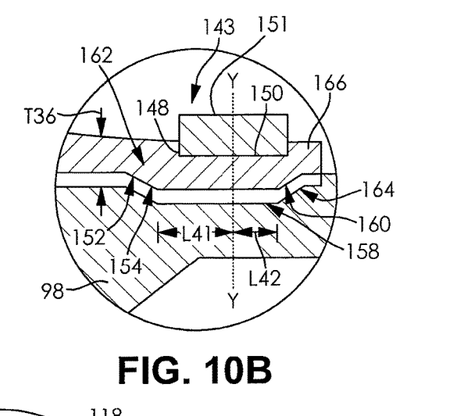
Figure 10C:
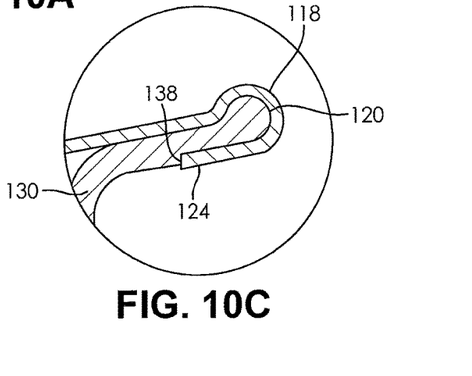

As best seen in FIGS. 10, 10A and 10C, the second end portion 114 comprises an outwardly angled, planar portion 116 and a boot can crimp head 118 at an end of the angled, planar portion 116. The boot can crimp head 118 first extends radially outward from the angled, planar portion 116 before it curves around on itself to create a semi-hemispherical hollow portion 120. A boot bead 121 is located in the portion 120. The boot bead 121 has an outward radially extending portion with a complementary shape to the portion 120.

One end 122 of a straight portion 124 of the can 110 connects with the semi-hemispherical hollow portion 120. The boot can 110 terminates at the other end 126 of the straight portion 124. The straight portion 124 is located radially inward from the angled, planar portion 116. A gap 128 separates the angled, planar portion from the straight portion 124.

With continued reference to FIG. 10, it can be seen that the boot thickness smoothly decreases from an upper slope region 130, through a concave region 132 down to a lower slope region 134. The range of thicknesses of the upper slope region may be generally designated as T31, the range of thicknesses of the concave region 132 may be designated T32 and the range of thicknesses of the lower slope region 134 may be generally designated as T33. The decrease in thickness is represented by T31>T32>T33. The decrease in thickness from the upper slope region 130 to the lower slope region 134 reduces boot radial deformation caused by high grease pressure anywhere in the boot 136, but is particularly effective at the upper slope region 130.

The boot 136 also includes a boot stopper 138 in the upper slope region 130, as shown in FIG. 10A. More particularly, the boot stopper 138 is located on an outside boot surface 140 that abuts, or is adjacent, the boot can straight portion 124. The boot stopper 138 comprises a radially inward step 142 into the boot 136 that reduces the thickness of the boot 136 at that location of the step 142. The boot stopper 138 prevents radial boot deformation via the direct contact with the boot can 110, particularly when the boot 136 is significantly deformed.

As can be appreciated by FIG. 10A, a press load δ2 is used to locate the upper slope region 130 into the boot can crimp head 118. The press load δ2 functions to minimize boot radial deformation.

Lower slope region 134 transitions to a boot clamping portion 143, as shown in FIG. 10B. The boot clamping portion 143 comprises three portions: L3 (as shown in FIG. 10A), L41, and L42. L3 comprises a planar portion 144 on an inside surface 146 of the boot 136. A press load δ1 is applied to L3 so that L3 is located in contact with the sleeve 98. The press load δ1 also minimizes the effect, if any, of an inside corner 148 of a boot seat groove 150 that can function like a hinge on the boot 136 to lift it away from the sleeve 98. A clamp 151 is located in the boot seat groove 150.

As seen in FIG. 10, the upper slope portion, the concave region and the lower slope region form a C-shape. As a result, the upper slope region is radially above the lower slope region and/or the boot clamping portion. Additionally, a portion of the boot clamping portion extends axially beyond the upper slope region. More particularly, the boot seat groove extends axially beyond the upper slope region.

A first angled transition 152 in the boot 136 separates L3 from L41 and L42. The first angled transition 152 has a complementary shape to a first angled transition 154 in an outer surface 156 of the sleeve 98. The first angled transition extends into the sleeve 98 at a radial angle. The first angled transition 154 in the sleeve 98 leads to a sleeve groove 158. The sleeve groove 158 is planar. A second angled transition 160 extends from the sleeve groove 158. The second angled transition 160 extends into the sleeve 98 at a radial angle.

L41 and L42 are coplanar surfaces with one another on the inside surface 146 of the boot 136. L41 is designed to be longer than L42; the two lengths being separated by line Y-Y which defines a centerline of the boot seat groove 150 and the clamp 151. It is preferred that L41 is longer than L42 to reduce or prevent region 162 from being lifted and tilted by the above-mentioned corner 148. Preferably, the thickness of the region 162 is gradually reduced from the general range of thicknesses in the region of T35 to the general range of thicknesses in the region of T36 along L3. The reduction in thickness also reduces or prevents the region 162 from being lifted and tilted by the corner 148. A second angled transition 164 in the boot 136, which is complementary to transition 160, connects L42 with a boot end portion 166.

L41 and L42 are parallel to the sleeve groove 158 and L41 and L42 are equal length compared with sleeve groove 158. And, upon application of a clamping force by the clamp 151, L41 and L42 come into contact with the sleeve groove 158. Similarly, the first and second angled transitions 152, 164 in the boot 136 come into contact with the first and second angled-transitions 154, 160 in the sleeve 98 upon application of the clamping force.

Figure 11:
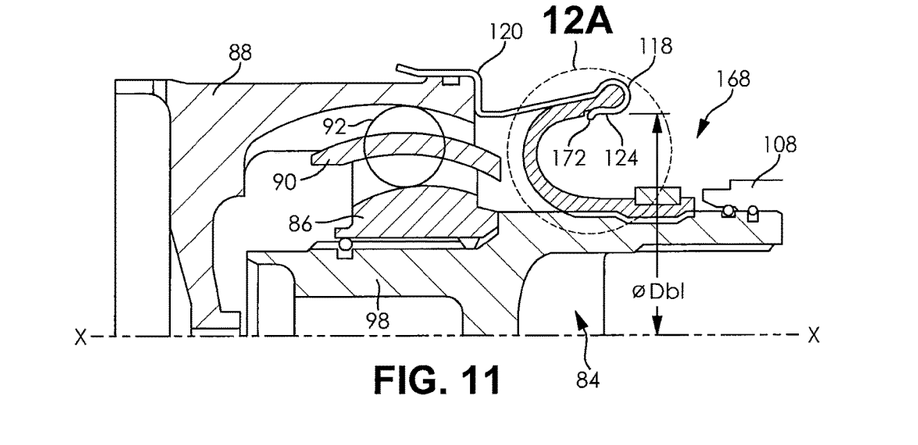
FIG. 11 is a partial side view cross section of a second embodiment of a constant velocity joint and boot system.

Turning now to FIG. 11, a second embodiment of a boot system 168 for the direct pinion joint 84 is depicted. The components of the joint 84 and the components of the boot system 168 are the same as those depicted in the first embodiment, except as follows.

In FIG. 11, the straight portion 124 is oriented parallel to a joint center line X-X to improve manufacturability of the boot can 120 and the crimp head 168 in the can 120 by controlling the boot can inner diameter Db1.

Further, the straight portion 124 does not abruptly terminate as in the first embodiment. Instead, a radiused end portion 172 that extends radially inward from the boot 136 is used.

Figure 12:
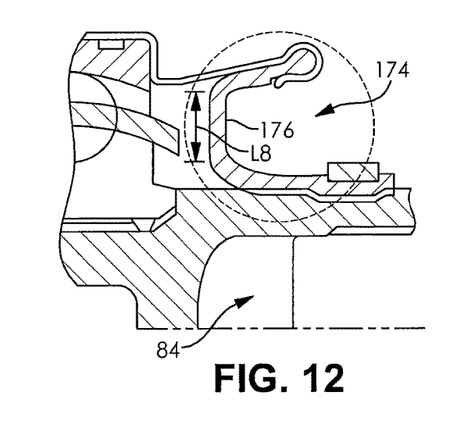
FIG. 12 is a partial side view cross section of a third embodiment of a constant velocity joint.
Figure 12A:
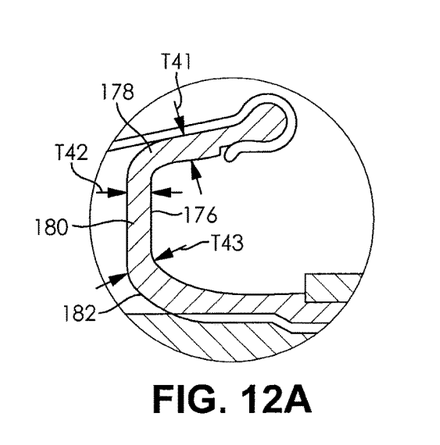
FIG. 12A is a partial side view cross section of a detail of the joint in FIG. 12.

FIGS. 12 and 12A depict a third embodiment of a boot system 174 for the direct pinion mount joint 84. The components of the joint 84 and the components of the boot system 174 are the same as those depicted in the first embodiment, except as follows.

A boot 176 in FIGS. 12 and 12A has a semi-half rectangular cross section that has a thickness that gradually and smoothly decreases from an upper slope region 178 through a concave region 180 down to a lower slope region 182. Put another way, the thickness T41 of the upper slope region 178 is greater than the thickness T42 of the concave region 180, which is greater than the thickness T43 of the lower slope region 182. Additionally, the boot 176 has a straight portion L8 between the upper slope region 178 and the lower slope region 182. The straight portion L8 may be on one or both sides of the boot 176. While FIGS. 12 and 12A depict L8 as having one length, other lengths are permissible. The straight portion L8 is designed to maintain grease pressure in the joint 84. The straight portion may have a thickness T42 that is substantially constant in order to maintain the grease pressure.

FIGS. 13 and 14A-14C depict a fourth embodiment of a boot system 184 for the direct pinion mount joint 84. The components of the joint 84 and the components of the boot system 184 as those depicted in the first embodiment, except as follows:

In this embodiment, the boot can crimp head 118 depicted and described in the previous embodiments is removed from the boot can 186. The boot can 186 has the second end portion 114 with an angled, planar portion 116. The boot can angled, planar portion 116 terminates in a radiused, radially outward extending end 188.

The boot can angled, planar portion 116 extends for a length L7. An inner surface 190 of the boot 192 is directly bonded or vulcanized to an inner surface 194 of the boot can 186 along the boot can angled, planar portion 116 at least partially along L7.

Figure 13:
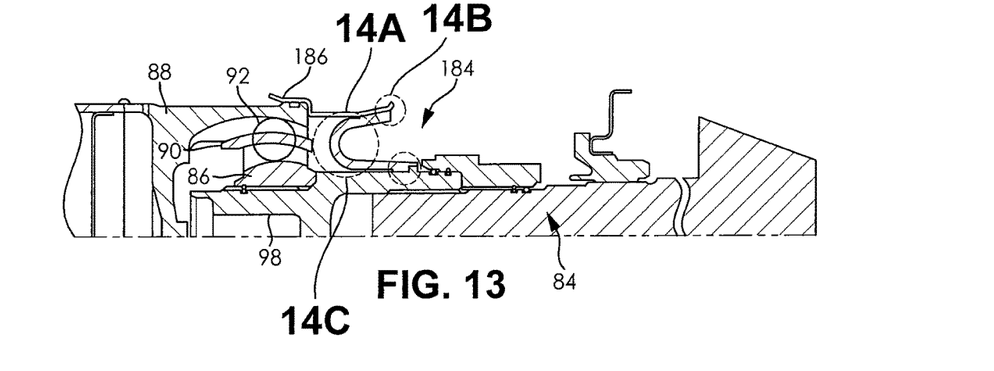
FIG. 13 is a partial side-view cross section of a fourth embodiment of a constant velocity joint and boot system.
Figure 14A:
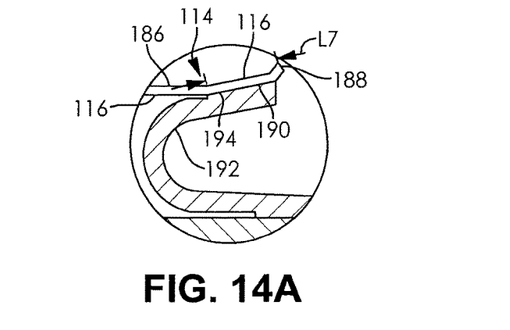
FIGS. 14A-14C comprises three partial side view cross sections of portions of the joint in FIG. 13.
Figure 14B:
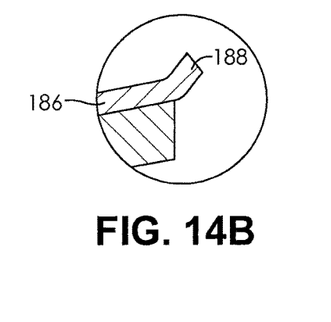
Figure 14C:
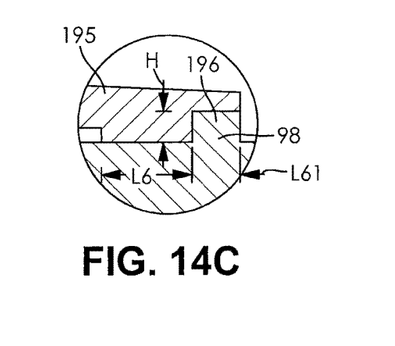

The boot can 186 and boot 192 attachment depicted in FIG. 14 provides additional space to increase joint angle capability compared with the first embodiment since the boot head crimp is removed. Additionally, the embodiment depicted in FIGS. 13 and 14A-14C helps simplify the manufacturing process since a boot can crimping step is not required.

With continued reference to FIGS. 14A-14C, a boot lower portion 195 may be directly bonded or vulcanized to the sleeve 98 along lengths L6 and L61. A step 196 may be provided between L6 and L61 so that a radial height difference H results. The bond or vulcanization of the boot lower portion 195 to the sleeve 98 prevents the boot 192 from being lifted and/or tilted by the inside corner 148, so that a boot clamp is not required. The step 196 provides increased surface area to connect the boot 192 and the sleeve 98. The step 196 also provides a stop against which the boot 192 rests to prevent its movement and lock it in place.

Except as described herein, the boot 192 has the same profile, parts and thicknesses for the upper slope region, the concave region and the lower slope region described in FIG. 10. This design reduces boot radial deformation, such as boot folding and self-contact, caused by high grease pressure.

Figure 15:
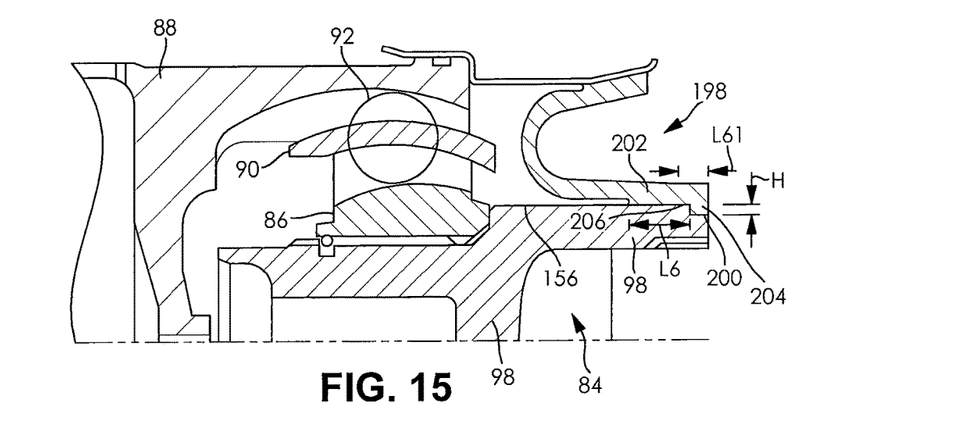
FIG. 15 is a partial side view cross section of a fifth embodiment of a constant velocity joint and boot system.

FIG. 15 depicts a sixth embodiment of a boot system 198 for the direct pinion mount joint 84. The components of the joint 84 and the components of the boot system 198 are the same as those depicted in the fourth embodiment, except as follows:

A groove 200 is located in the outer surface 156 of the sleeve 98. The groove 200 extends continuously circumferentially about the outer surface 156 of the sleeve 98 at the same sleeve axial location. In the depicted embodiment, the groove 200 has a rectangular cross-section, but other shapes are permissible. The groove 200 is located axially adjacent L6. The groove 200 has a length L61, which is less than L6. The groove 200 has a depth H, which preferably is the same height H as the step in FIG. 14.

A boot lower portion 202 terminates in a rib 204. The rib 204 preferably extends continuously circumferentially radially inward about an inside surface 206 of the boot lower portion 202. The rib 204 has a complementary shape to the groove 200 and also has height H. In this embodiment, the rib 204 has a rectangular cross-section, but others are permissible.

The groove 200 and rib 204 provide increased surface area to connect the boot 208 and the sleeve 98. The groove 200 and rib 204 also function as a stop to prevent movement of the boot 208 and lock it in place.

Figure 16:
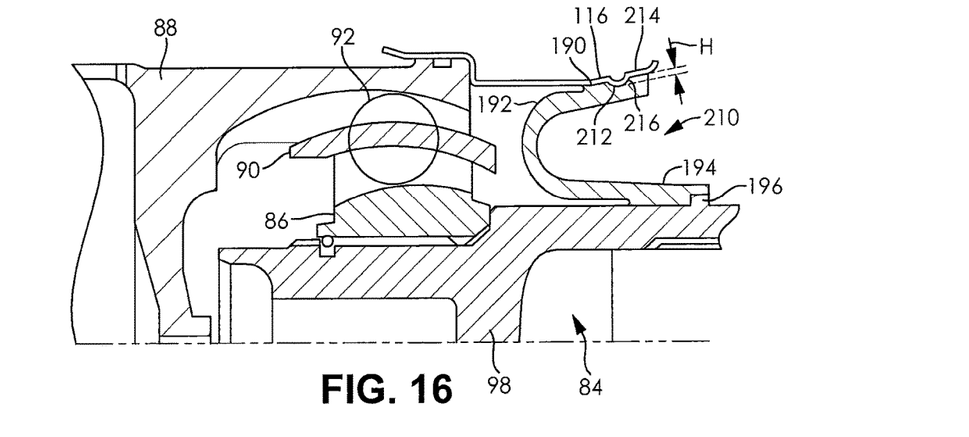
FIG. 16 is a partial side view cross section of a sixth embodiment of a constant velocity joint and boot system.

FIG. 16 depicts a seventh embodiment of a boot system 210 for the direct pinion mount joint 84. The components of the joint 84 and the components of the boot system 210 are the same as those depicted in the fourth embodiment, except as follows.

A groove 212 is located in the boot can angled, planar portion 116. Preferably, the groove 212 is located at a mid-point between the ends of the angled, planar portion 116 but it may be located at any point between the ends.

The groove 212 creates a concave surface in an upper surface 214 of the boot can 186 and a corresponding convex surface in a lower surface 216 of the boot can 186. The groove 212 preferably has the same depth as the radial height H depicted and described in FIG. 14 of the fourth embodiment.

As in the fourth embodiment, the inner surface 190 of the boot 192 is directly bonded or vulcanized to the boot can angled, planar portion 116 along the lower surface 216 of the boot can 110 to provide the same advantage. The boot lower portion 194 is similarly attached to the sleeve 54. The boot 192 has the same thickness as described above for the fourth embodiment.

The groove 212 provides increased surface area to connect the boot 192 and the boot can 186. The step 196 also provides a stop against which the boot 192 rests to prevent its movement and lock it in place.

Figure 17:
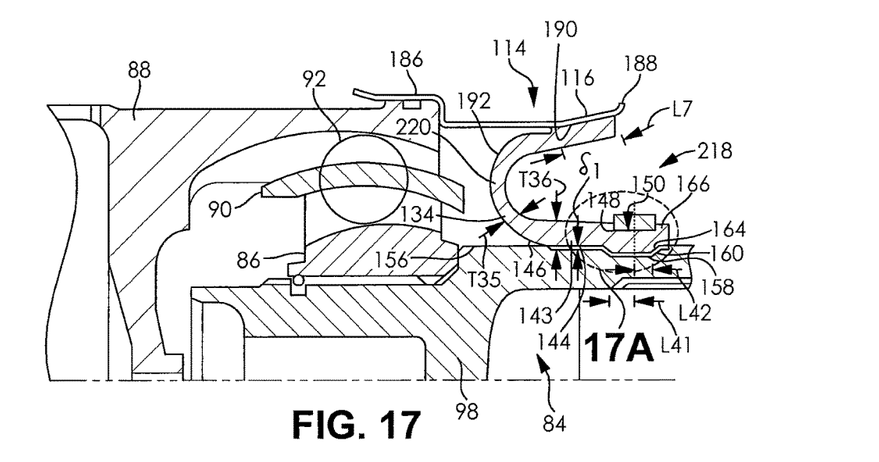
FIG. 17 is a partial side view cross section of a seventh embodiment of a constant velocity joint boot system.
Figure 17A:
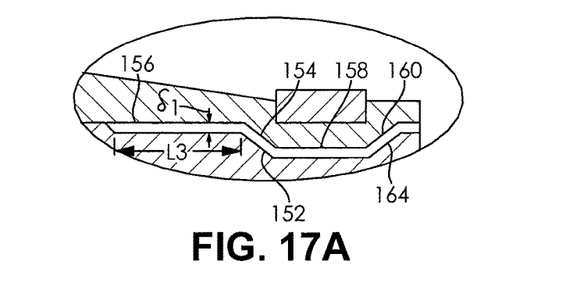
FIG. 17A is a partial side view cross section of a detail from FIG. 17.

FIGS. 17 and 17A depict a seventh embodiment of a boot system 218 utilizing the same components of the joint 84 with some of the boot system components from FIGS. 9-10 and FIG. 13.

The boot can 186 has the second end portion 114 with the angled, planar portion 116. The boot can angled, planar portion 116 terminates in the radiused, radially outward extending end 188, as shown in the embodiment depicted in FIG. 13.

The boot can angled, planar portion 116 extends for length L7. The inner surface 190 of the boot 192 is directly bonded or vulcanized to the boot can angled, planar portion 116 at least partially along L7.

The boot can 186 and the above-described method of attaching the boot 192 provides additional space to increase joint angle capability compared with the first embodiment since the boot head crimp is removed. Additionally, this design helps simplify the manufacturing process since a boot can crimping step is not required.

FIG. 17 shows a lower slope region 134 transitioning to the boot clamping portion 143 as described and depicted in FIG. 10. The boot clamping portion 143 comprises three portions: L3, L41, and L42. L3 is depicted in FIG. 17A. L3 comprises the planar portion 144 on the inside surface 146 of the boot 220. A press load δ1 is applied to L3 so that L3 is located in contact with the sleeve 98. The press load δ1 also minimizes the effect, if any, of the inside corner 148 of the boot seat groove 150 that functions like a hinge.

The first angled transition 152 separates L3 from L41 and L42. The first angled transition 152 has a complementary shape to the first angled transition 154 in the outer surface 156 of the sleeve 98. The first angled transition 154 in the sleeve 98 leads to a sleeve groove 158. A second angled transition 160 extends from the sleeve groove 158.

L41 and L42 are coplanar surfaces with one another on the inside surface 146 of the boot 220. L41 is designed to be longer than L42; the two lengths being divided by line Y-Y which defines a centerline of the sleeve groove 158. It is preferred that L41 is longer than L42 to help prevent region 146 from being lifted and tilted by the above-mentioned hinge. Preferably, the thickness of the region 146 is reduced from T35 to T36 along L3. This is designed to also prevent the region 146 from being lifted and tilted by the hinge. A second angled transition 164 connects with the boot end portion 166.

L41 and L42 are parallel to the sleeve groove 158. And, upon application of a clamping force, L41 and L42 come into contact with the sleeve groove 158. Similarly, the first and second angled transitions 152, 164 in the boot 220 come into contact with the first and second angled transitions 154, 160 in the sleeve 98 upon application of the clamping force.

Figure 18:
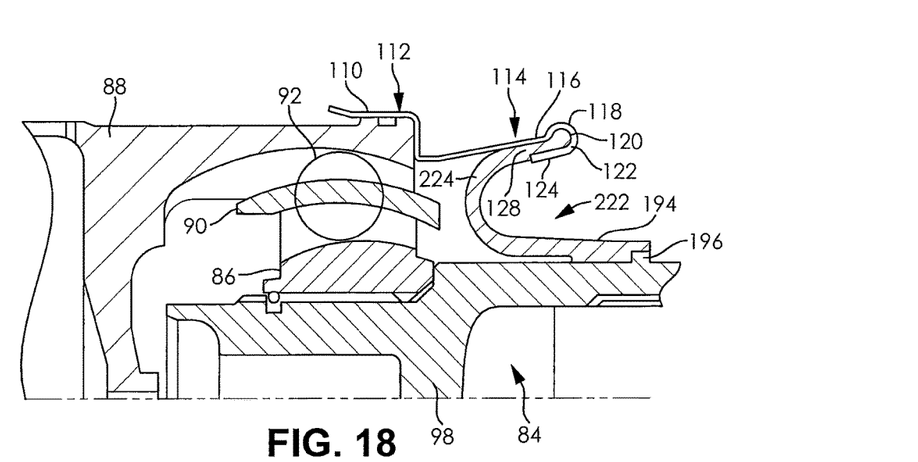
FIG. 18 is a partial side view cross section of an eighth embodiment of a constant velocity joint boot system.

FIG. 18 depicts an eighth embodiment of a boot system 222 utilizing the same components of the joint 84 with some of the boot system components from FIGS. 9-10 and FIG. 14.

As seen in FIG. 18, the boot can 110 has a first end portion 112 connected to the outer race 88 and a second end portion 114 that is cantilevered over the joint 84. More particularly, the second end portion 114 is cantilevered over a portion of the sleeve 98.

The second end portion 114 comprises the angled, planar portion 116 and the boot can crimp head 118 at the end of the angled, planar portion 116. The boot can crimp head 118 first extends radially outward from the angled, planar portion 116 before it curves around on itself to create the semi-hemispherical hollow portion 120. One end 122 of the straight portion 124 of the can 110 connects with the semi-hemispherical hollow portion 120. The boot can 110 terminates at the other end of the straight portion 124. The straight portion 124 is located radially inward from the angled, planar portion 116. The gap 128 separates the angled planar portion 116 from the straight portion 124.

The boot lower portion 194 is attached to the sleeve 98 such as via a direct bond or vulcanization. The step 196 provides increased surface area to connect the boot 224 and the sleeve 98 and it provides a stop against which the boot 224 rests to prevent its movement and lock it in place.

Figure 19:
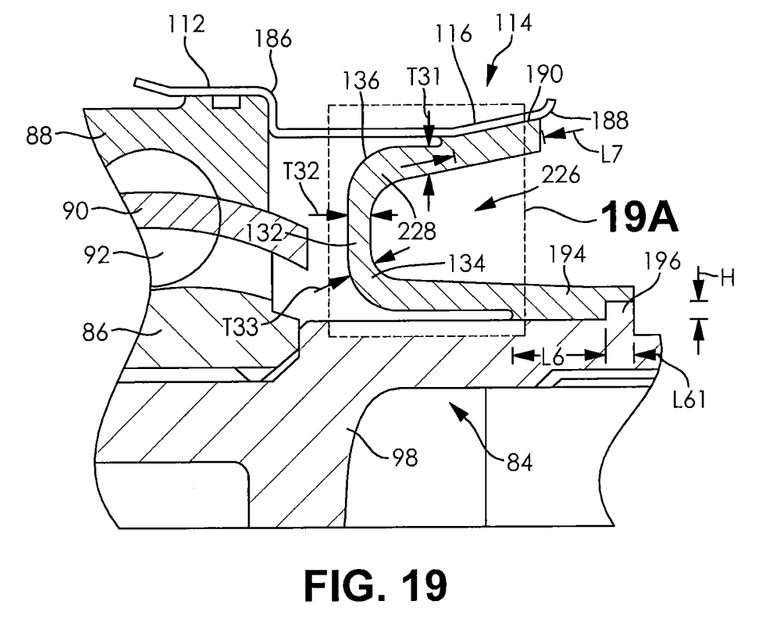
FIG. 19 is a partial side view cross section of a ninth embodiment of a constant velocity joint boot system.
Figure 19A:
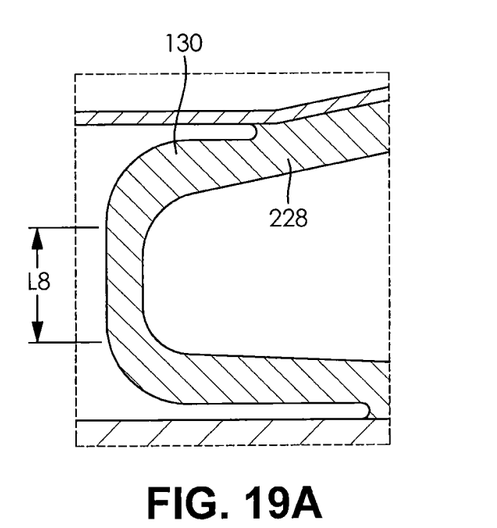
FIG. 19A is a partial side view cross section of a detail from FIG. 19.

FIGS. 19 and 19A depicts a ninth embodiment of a boot system 226 utilizing the same components of the joint 84 with some of the boot system components from FIGS. 12 and 13.

The boot can 186 has the second end portion 114 with an angled, planar portion 116. The boot can angled, planar portion 116 terminates in a radiused, radially outward extending end 188.

The boot can angled, planar portion 116 extends for a length L7. The inner surface 190 of the boot 228 is directly bonded or vulcanized to the boot can angled, planar portion 116 at least partially along L7.

The boot 228 as depicted in FIGS. 19 and 19A has a semi-half rectangular cross section that has a thickness that gradually and smoothly decreases from the upper slope region 130 through the concave region 132 down the lower slope region 134. Put another way, the thickness T31 of the upper slope region 130 is greater than the thickness T32 of the concave region 132, which is greater than the thickness T33 of the lower slope region 134. Additionally, the boot has the straight portion L8 between the upper slope region 130 and the lower slope region 134. The straight portion L8 is designed to maintain grease pressure in the joint 84. Grease pressure is maintained since the boot thickness 229 along L8 is substantially constant.

With continued reference to FIG. 19, the boot lower portion 194 may be directly bonded or vulcanized to the sleeve 98 along lengths L6 and L61. The step 196 may be provided between L6 and L61 so that a radial height difference H results. The bond or vulcanization of the boot lower portion 194 to the sleeve 98 prevents the boot 228 from being lifted and/or tilted by the inside corner 148, so that no boot clamp is required. The step 196 provides increased surface area to connect the boot 228 and the sleeve 98. The step 198 also provides a stop against which the boot rests to prevent its movement and lock it in place.

In addition to the various embodiments described above, other embodiments are also permissible wherein any of the boot system components described above may be combined with one another.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A constant velocity joint boot assembly, comprising:
a boot can having a first end portion connected to an outer race and a second end portion cantilevered from said outer race, said second end portion having a planar portion extending from said first end portion at an angle, wherein a radially outward extending end extends from said planar portion; and
a boot having a first end and a second end, wherein said first end has an inner surface that is directly connected to an inner surface of said planar portion of said boot can;
a sleeve having one end portion connected to an inner surface of an inner race with complementary splines and a second end portion extending axially away from said inner race;
wherein said boot has a lower portion engaged with a step on said sleeve, said sleeve comprised of a first axial length, a second axial length and a first radial length, said boot comprised of a first axial length complementary to said first axial length of said sleeve, a second axial length complementary to said second axial length of said sleeve and a first radial length complementary to said first radial length of said sleeve, wherein a thickness of said boot constantly decreases along the entire length of said first axial length and said second axial length of said boot, wherein each of said second axial lengths are less than said first axial lengths and each of said first radial lengths locate each of said first axial lengths at a different radial height than said second axial lengths, wherein said second axial lengths of said boot and said sleeve terminate together at an axial end of said step and said boot.

2. The constant velocity joint boot assembly of claim 1, wherein said boot terminates on said boot can before reaching said radially outward extending end of said boot can.

3. The constant velocity joint boot assembly of claim 1, wherein said boot can does not have a crimp head.

4. The constant velocity joint boot assembly of claim 1, wherein said radially outwardly extending end is directly attached to said planar portion.

5. The constant velocity joint boot assembly of claim 1, wherein said inner surface of said boot and said boot lower portion are directly bonded or vulcanized to said inner surface of said boot can and said sleeve, respectively.

6. The constant velocity joint boot assembly of claim 1, wherein said boot has, in order, an upper slope region, a concave region and said boot lower portion, wherein the thickness of the boot decreases from said upper slope region to said concave region and then said boot lower portion, respectively.

7. The constant velocity joint boot assembly of claim 1, wherein said sleeve second end portion receives a pinion shaft therein.

8. The constant velocity joint boot assembly of claim 7, wherein a nut connects said pinion shaft with said sleeve.

9. The constant velocity joint boot assembly of claim 7, wherein said pinion shaft does not have a groove for said boot.

10. The constant velocity joint boot assembly of claim 1, wherein said boot is not secured to said sleeve with a clamp.

11. The constant velocity joint boot assembly of claim 1, wherein said boot terminates before reaching an end of said sleeve and does not overlap said sleeve end.

12. The constant velocity joint boot assembly of claim 1, wherein said radially outboard extending end extends from said planar portion at a different angle than the angle of said planar portion.

13. The constant velocity joint boot assembly of claim 1, wherein said inner surface of said boot is the only portion of the boot connected to said boot can.

14. A constant velocity joint boot assembly, comprising:
a boot can having a first end portion connected to an outer race and a second end portion cantilevered from said outer race, said second end portion having a planar portion extending from said first end portion at an angle, wherein a radially outward extending end extends from said planar portion; and
a boot having a first end and a second end, wherein said first end has an inner surface that is directly connected to an inner surface of said planar portion of said boot can;
a sleeve having one end portion connected to an inner surface of an inner race with complementary splines and a second end portion extending axially away from said inner race;
wherein said boot has a lower portion engaged with a step on said sleeve, said sleeve comprised of a first axial length, a second axial length corresponding to an entire axial length of said step and a first radial length, said boot comprised of a first axial length complementary to said first axial length of said sleeve, a second axial length complementary to said second axial length of said sleeve and a first radial length complementary to said first radial length of said sleeve, wherein a thickness of said boot constantly decreases along the entire length of said first axial length of said boot, wherein each of said second axial lengths are less than said first axial lengths and each of said first radial lengths locate each of said fist axial lengths at a different radial height than said second axial lengths, wherein said second axial lengths of said boot and said sleeve terminate together at an axial end of said step and said boot.

15. A constant velocity joint boot assembly, comprising:
a boot can having a first end portion connected to an outer race and a second end portion cantilevered from said outer race, said second end portion having a planar portion extending from said first end portion at an angle, wherein a radially outward extending end extends from said planar portion; and
a boot having a first end and a second end, wherein said first end has an inner surface that is directly connected to an inner surface of said planar portion of said boot can;
a sleeve having one end portion connected to an inner surface of an inner race with complementary splines and a second end portion extending axially away from said inner race;
wherein said boot has a lower portion engaged with a step on said sleeve, said sleeve comprised of a first axial length, a second axial length corresponding to an entire axial length of said step and a first radial length, said boot comprised of a first axial length complementary to said first axial length of said sleeve, a second axial length complementary to said second axial length of said sleeve and a first radial length complementary to said first radial length of said sleeve, wherein a thickness of said boot constantly decreases along the entire length of said first axial length and said second axial length of said boot, wherein each of said second axial lengths arc less than said first axial lengths and each of said first radial lengths locate each of said first axial lengths at a different radial height than said second axial lengths, wherein said second axial lengths of said hoot and said sleeve terminate together at an axial end of said step and said boot.

* * * * *

UNITED STATES PATENT AND TRADEMARK OFFICE
CERTIFICATE OF CORRECTION

PATENT NO. : 10,184,526 B2
APPLICATION NO. : 15/404919
DATED : January 22, 2019
INVENTOR(S) : Seung Tark Oh

Page 1 of 1

It is certified that error appears in the above-identified patent and that said Letters Patent is hereby corrected as shown below:

In the Claims

Claim 14, Column 10, Line 11, the word "haying" should be deleted and replaced with "having"
Claim 15, Column 11, Line 4, the word "hoot" should be deleted and replaced with "boot"

Signed and Sealed this
Nineteenth Day of March, 2019

Andrei Iancu
*Director of the United States Patent and Trademark Office*